US006273284B1

(12) United States Patent
Nottage

(10) Patent No.: US 6,273,284 B1
(45) Date of Patent: Aug. 14, 2001

(54) MICROMATE

(75) Inventor: Santana Lavon Nottage, Ellicott City, MD (US)

(73) Assignee: Santana Nottage, Ellicott City, MD (US)

( * ) Notice: Subject to any disclaimer, the term of this patent is extended or adjusted under 35 U.S.C. 154(b) by 0 days.

(21) Appl. No.: 09/666,383

(22) Filed: Sep. 20, 2000

Related U.S. Application Data

(60) Provisional application No. 60/155,479, filed on Sep. 23, 1999.

(51) Int. Cl.[7] .............................. H05B 6/64; A47J 43/00

(52) U.S. Cl. ..................... 220/4.26; 220/7; 219/10.55 E; 211/195

(58) Field of Search .................... 219/10.55 E; 211/195; 220/9.2, 6, 7, 4.26

(56) References Cited

U.S. PATENT DOCUMENTS

| | | | | |
|---|---|---|---|---|
| 1,401,057 | * | 12/1921 | Elliott . | |
| 1,814,740 | * | 7/1931 | Rapp . | |
| 3,006,292 | * | 10/1961 | Hilgers . | |
| 3,684,255 | * | 8/1972 | Kane | 211/195 |
| 3,783,801 | * | 1/1974 | Enman | 211/195 |
| 4,272,663 | * | 6/1981 | Green | 219/10.55 E |
| 4,847,461 | * | 7/1989 | Gilmore | 219/10.55 E |

* cited by examiner

*Primary Examiner*—Joseph M. Moy

(57) ABSTRACT

A retractable microwave plate stacker that can cook up to four dishes in any microwave oven at once. The plate stacker can be adjusted by rotating plate members in opposite direction which can retract and contract. The plate stacker can be retracted to a height of 1 inch, making this product easy to store and transport.

2 Claims, 4 Drawing Sheets

MICROMATE

CROSS REFERENCE TO RELATED APPLICATIONS

This application is entitled to the benefit of Provisional Patent Application Ser. No. 60/155,479 filed Sep. 23, 1999.

BACKGROUND—Field of Invention

This invention relates in general to retractable cookware and in particular to a retractable device designed for use in the microwave oven.

BACKGROUND—Prior Art

Families, offices, dorms, and restaurants alike commonly use the microwave oven to cook/heat food for a multitude of people. In most instances everyone needed to use the microwave oven at the same time. (ie. Supper, lunchbreak, etc.)

Originally people would have to race to the microwave to be at the front of the line, attempt to squeeze to plates side by side in the microwave, or wait until the people in front of them were finished cooking their meals.

A number of stackable microwave stands were created to remedy these everyday problems. U.S. Pat. No. 373,708 (1996) discloses a microwave stack tray capable of heating three plates at once; however this tray is not suitable for microwave ovens of all sizes. U.S. Pat. No. 4,847,461 discloses a stackable plate arrangement for microwave dishes which is an inconvience in itself due to the fact that it has to be assembled prior to each use. U.S. Pat. No. 4,272,663 discloses a meat cooking apparatus which is not intended for a plurality of dishes. As can be seen by reference to U.S. Pat. Nos: 1,814,740, 1,401,057, & 3,006,292 the prior art is of secondary interest and are unrelated to microwave use.

SUMMARY

The principal object of the present invention is to provide a retractable plate stacker with a safety locking mechanism. It is also an object to provide a retractable microwave plate stacker suitable for ue in microwave ovens of all sizes. Another object is to provide a retractable plate stacker that can be adjusted to heat up to four large dishes of similar and dissimilar food items simultaneously. A further object is to provide a retractable plate stacker with a safety locking mechanism which will prevent plates from sliding out of the spaces between tiers. A final objective is to provide a retractable plate stacker that is fully assembled.

The foregoing objects can be accomplished by creating a microwave plate stacker which will comprise four circular plates with six ball shaped pegs located along the periphery of each plate, along with stopples formed proximate each peg. Attached to each plate is a safety latch which can be secured to the underside of each plate. Attached to each peg is a retractable leg.

DETAILED DESCRIPTION OF DRAWINGS

Figure 1:
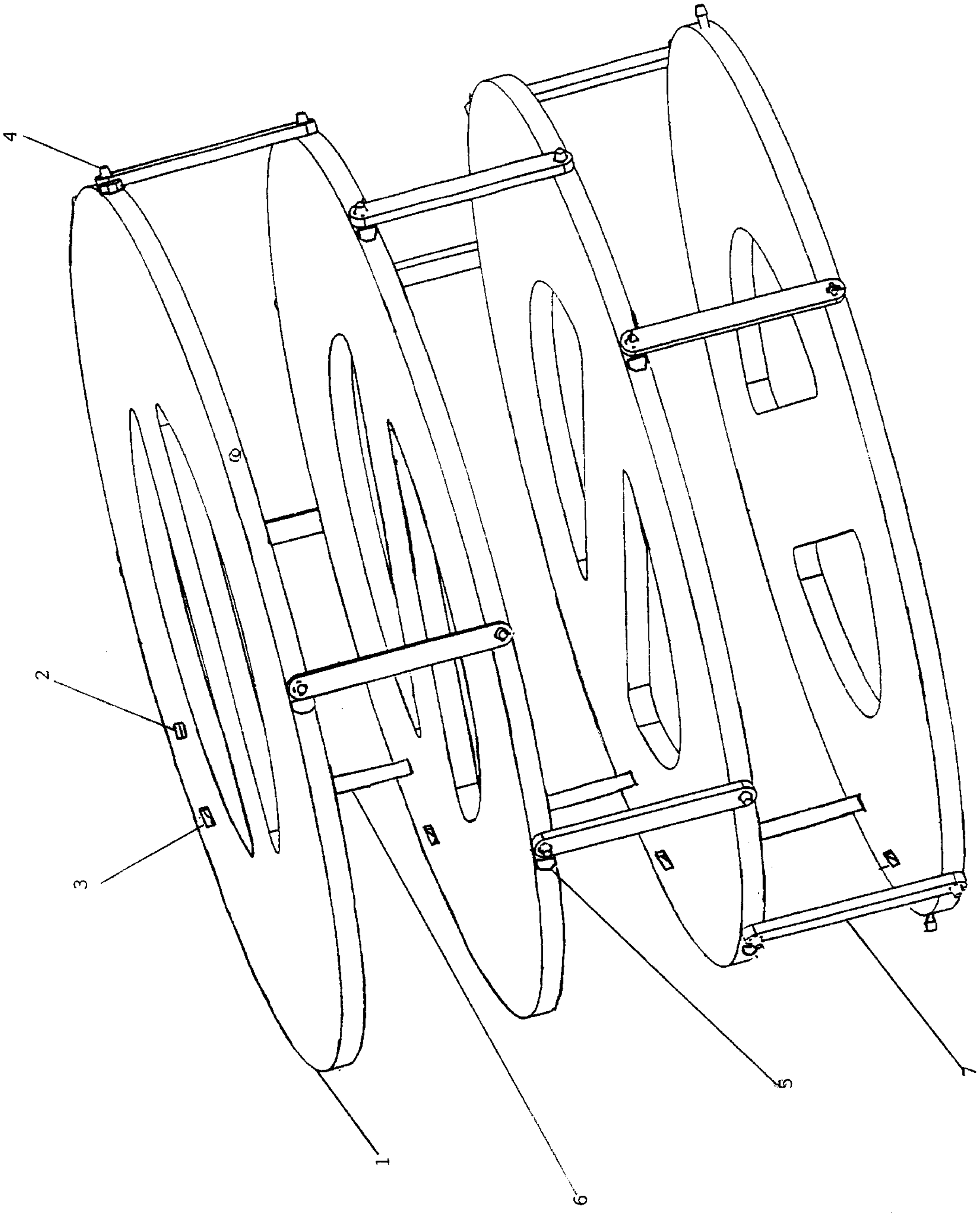
FIG. 1 is a view in elevation of a microwave plate stacker embodying the invention.
Figure 2:
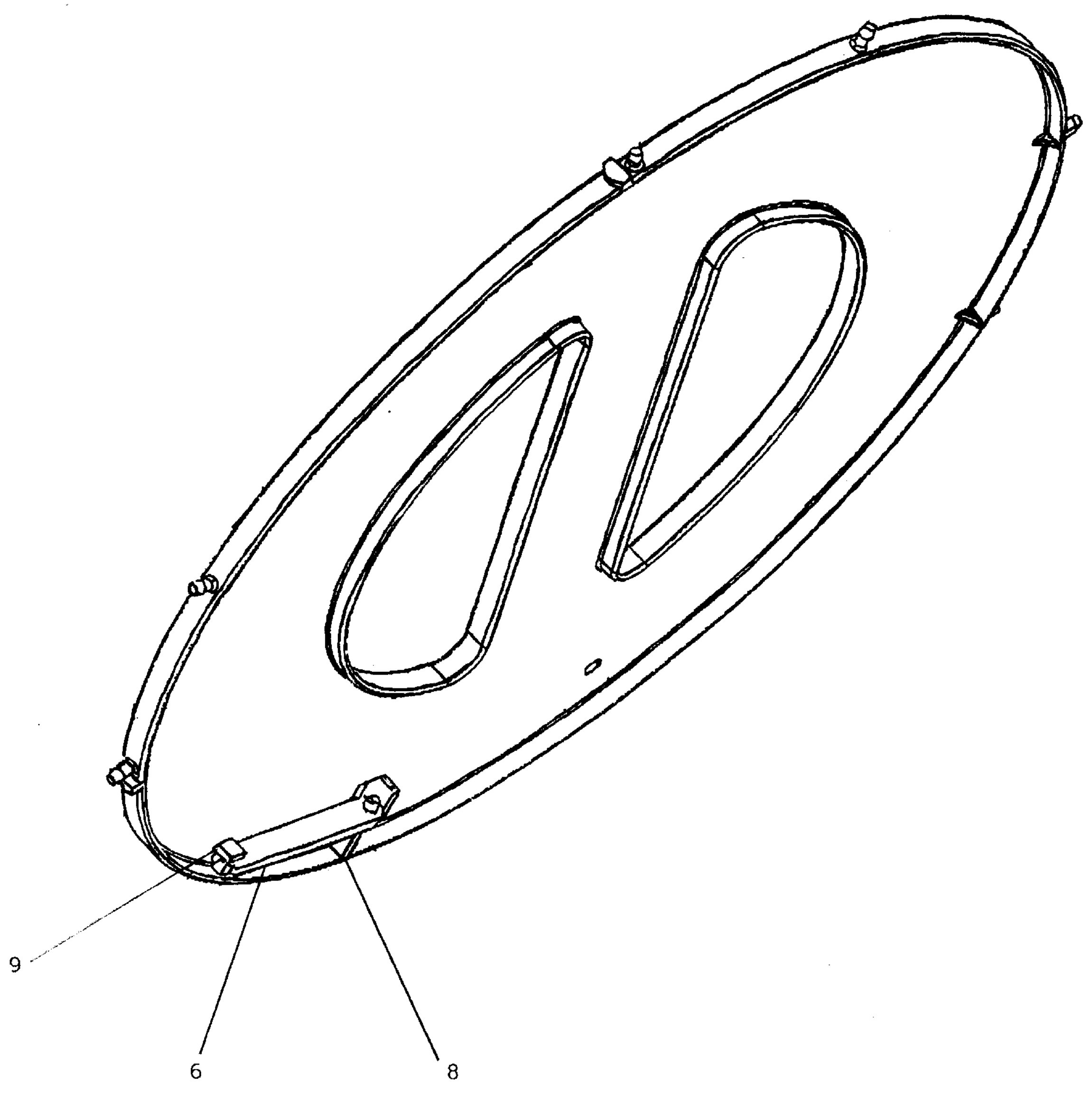
FIG. 2 is a sectional top view of the current invention.
Figure 3:
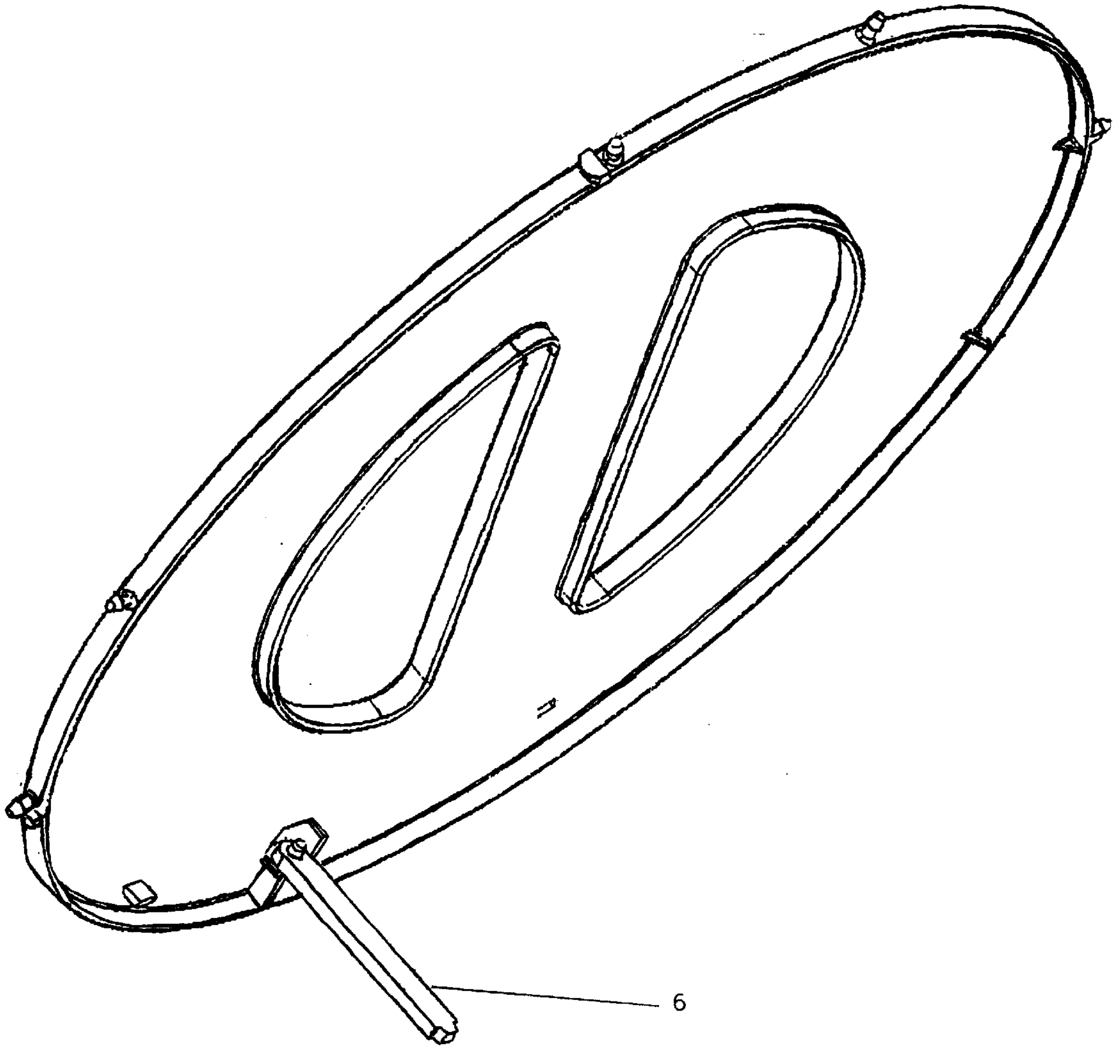
FIG. 3 is a undersurface view of one single plate having a attached safety latch located on the underside of each plate.
Figure 4:
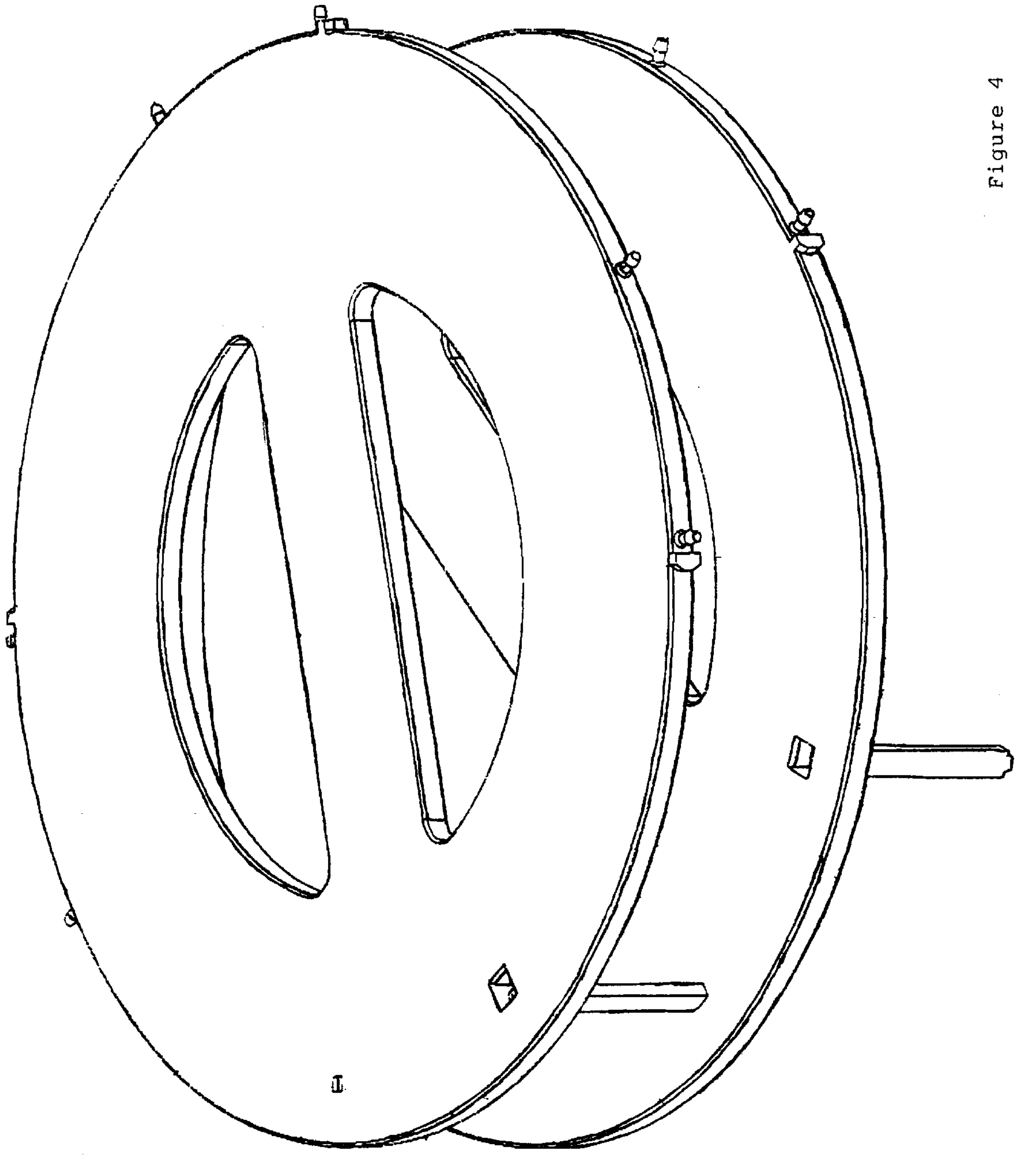
FIG. 4 is a undersurface view of one single plate having a detached safety latch located on the underside of each plate.

As shown in the drawings the preferred retractable plate stacker device in accordance with the present invention includes four double semicircular apertured plate members which is preferable of any high ozide, high flow, FDA approved microwave safe plastic or any desired material. FIG. 1:2 shows the smaller of the two square apertures which exist connect the indented end of the elongated safety latch to the plate in the position inferior to it. FIG. 1:3 is the larger of the square shed apertures with the centered hook and latch which is stored on the underside of the plate member. FIG. 1:4 shows the pegs that are located on the periphery of each plate member which joins both ends of the elongated, retractable leg support units to the plate members FIG. 1:5 shows the stopples proximate to the pegs which exist to prevent leg support units from retracting in the wrong direction. FIG. 1:6 shows the safety locking mechanism which exist to reinforce leg support units and prevent dishes from sliding plate members. FIG. 7 describes the elongated retractable leg support units. FIG. 2 is a view of the undersurface of he plate member. FIG. 2:8 describes the raised L-shaped mission which stores FIG. 2:6 the safety latch to the underside of the plate member which is also stored/held in place by FIG. 2:9 a straight raise impression. FIG. 3 is an additional underscore view of the member plate. FIG. 3:6 illustrates the safety latch detached from the raised strait impression FIG. 3:9. FIG. 4 describes the top view of partial plate stacker.

The opposite end of the latch can be secured to a raised impression located on the undersurface of the plate as well. As can be seen in FIG. (4),the free end of the safety latch on the underside of the plate once released and secured to an aperture on another plate beneath it. Joined to each (1) peg is an elongated, retractable legs, which retract and support the microwave plate stacker.

I claim:

1. A retractable microwave plate stacker for use in microwave ovens wherein the arrangement cores:

a. a plurality of centered double semicircular apertured plate units; wherein, each of the plurality of centered, double semicircular plate units comprise; a double centered semicircular apertured flat plate member having two small squared shaped apertures one containing a center hook proximal the periphery of the plate member also a plurality of spaced pegs along with a plurality of stopples formed proximate each peg along the periphery of each plate member; wherein, the undersurface of each centered double semicircular apertured plate member comprise a raise L shaped impression which is a continuation of one of the said square shaped apertures containing a center hook located on the uppermost side of the plate member and each of the said center hook portions is joined by a elongated latch comprising an upper portion comprising a circular cavity connecting the latch to the said hook and a lower portion comprising an indented end and a second raised impression to store latch to undersurface of plate; and a plurality of support units comprising at least one upper part and at least one lower part of retractable elongated leg members having circular cavities on both ends wherein the support units are adapted to engage to the said circular shaped pegs on the periphery of the plate units and operatively connect and retract said plurality of plate units together; wherein, said at least one upper and one lower part are required to connect and retract one of the said plurality of centered double semicircular apertured plate units; and wherein the indented portion of the said latch on the said undersurface of each of the said centered double semicircular apertured plate units can be released from the said second raised impression to engage with the second said square aperature without a centered hook on the plate unit inferior to it.

2. An arrangement as in claim 1 wherein said plate of plurality units may be either equally spaced from one another or equally retracted by said operative engagement with the said plurality of support units.

* * * * *